June 25, 1940.  T. J. SMULSKI  2,205,637
ELECTRICAL INDICATING SYSTEM
Filed Nov. 10, 1938
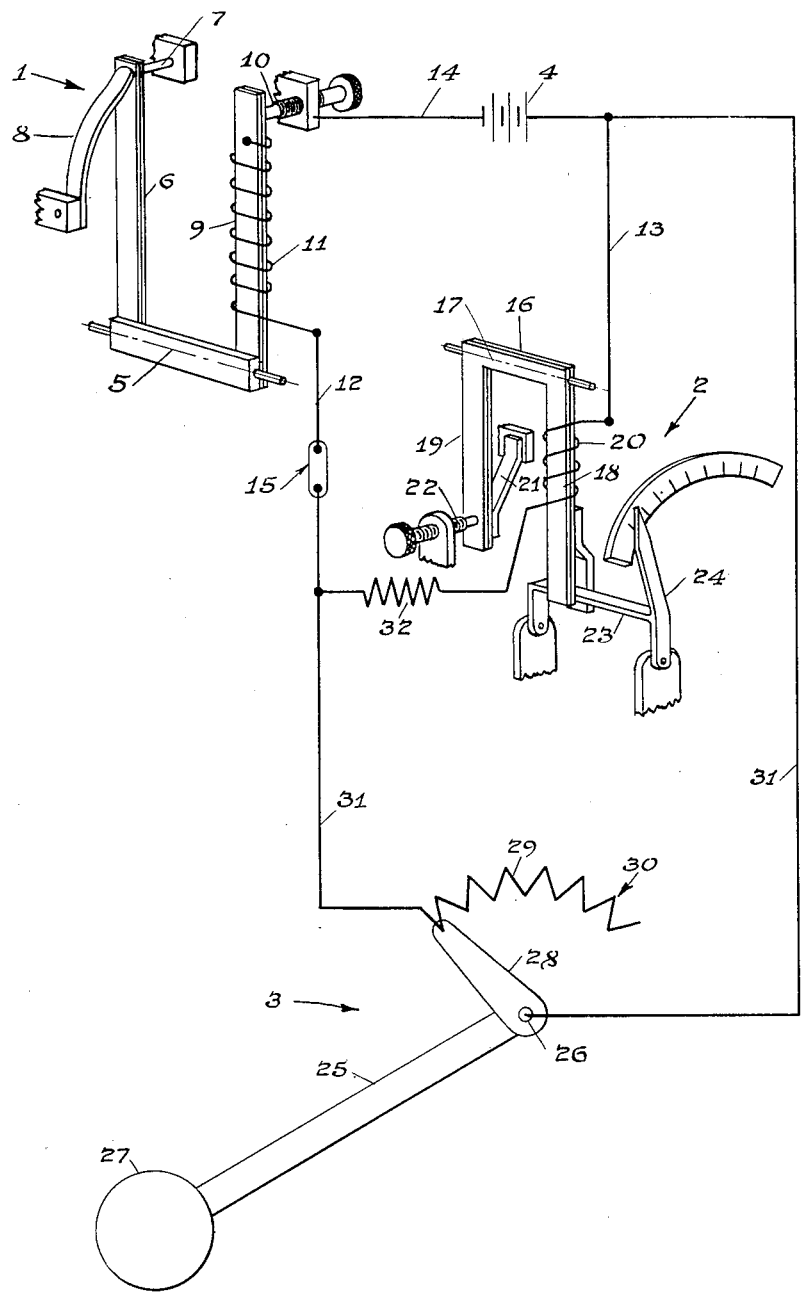
INVENTOR
Theodore J. Smulski.
BY
W. G. Sullivan
ATTORNEY Patented June 25, 1940

2,205,637

UNITED STATES PATENT OFFICE 2,205,637

ELECTRICAL INDICATING SYSTEM

Theodore J. Smulski, Knox, Ind., assignor to The Anderson Company, Gary, Ind., a corporation of Indiana Application November 10, 1938, Serial No. 239,840

10 Claims. (Cl. 171—95)

This invention relates to electrical systems, with particular reference to an electro-thermal apparatus adapted to indicate accurately a variable condition when other conditions affect the system in a manner tending to render the apparatus inaccurate.

The invention is adaptable for various uses requiring the accurate control of a suitable indicating instrument and in which the effect of various conditions other than that being measured tend to prevent accurate response of the indicator in accordance with a measurable condition.

In the present embodiment the device is arranged to effect remote indication of the quantitative value of a physical condition such as variation in a liquid level or any other physical condition capable of exerting movement of an element at a controlling station in accordance with the variation of the condition.

The invention is illustrated in connection with a liquid level indicator showing the variation in fuel supply of an automotive vehicle, but it will be understood that it may be applied to indicating variation of any physical condition wherein movement of an element at the point of manifestation of such physical condition may be effected in correspondence with variation in the condition. The apparatus comprises two bimetallic type thermostats which jointly control movement of an indicating needle. One thermostat is adapted primarily to effect movement of the indicating needle and the other thermostat is provided primarily to compensate for voltage variation in the circuit whereby the indicating needle will correctly indicate a given physical condition irrespective of variation in voltage. Each thermostat is actuated by an electrical heating coil associated therewith and is compensated for variation in ambient temperature which would otherwise render the indication inaccurate.

The controller disposed at the point of manifestation of the physical condition, the gasoline tank in this instance, comprises a variable resistance and a contact finger movable over the resistance in accordance with variation in the physical condition such as liquid level.

It is an object of the invention to effect accurate graduated control of the indicating element of an electrical instrument, under the joint effects of means arranged to vary a circuit characteristic in response to a variable condition; ambient thermal effects tending to prevent the accurate characteristic variation, and the effect of a varying electrical condition in the instrument circuit.

It is also a particular object of the invention to provide an electrically operated indicating apparatus in which accuracy of the indicator reading is maintained, regardless of variations in voltage.

Another object of the invention is to provide an electrically operated apparatus comprising an indicating needle movable under the joint control of a pair of electro-responsive devices and wherein means are provided for adjusting each of said devices to adjust the position of the indicating needle for a given condition.

Another object of my invention is to provide an improved electrically operated indicating apparatus which is relatively economical of construction and installation and which employs a relatively small amount of current.

Other objects of my invention and the invention itself will become increasingly apparent from a consideration of the following description and drawing, wherein:

The single figure is a view largely diagrammatic of a preferred form of my invention.

Referring to the drawing in detail, the embodiment illustrated is particularly adapted for use as a liquid level indicator, such as a so-called gauge for gasoline tanks on automobiles, and is arranged to provide a constant accurate indication of the liquid level in the tank. It will be understood, however, that this adaptation is merely illustrative and the invention is susceptible to various other uses.

The device is illustrated diagrammatically; however, it will be understood that the usual suitable casings or housings are provided for the instruments, and when the device is used in connection with a gasoline tank the controlling electrical members are suitably housed and insulated in the usual manner.

The invention comprises an electrical indicating system in which a measurable condition may be impressed on the system, and means is provided for producing electrical energy adapted to control the operation of a suitable indicating instrument in accordance with, or relative to, the variable condition being measured.

The electrical system comprises a so-called primary instrument 1, arranged to automatically produce current pulsations in the system for controlling the operation of an indicating instrument regardless of variations in voltage in the electrical circuit; an indicating instrument 2; and a condition responsive device 3. The condition responsive device may be in the form of the usual float, movable in response to variations in liquid level, and having means controlled thereby for commensurably impressing the effect of the variations on the electrical system.

The primary instrument 1 is in series with the indicating instrument 2 and with an electrical power source, such as a battery 4. The primary instrument is particularly for the purpose of maintaining a substantially constant energy flow, in at least a portion of the circuit regardless of the combined effect of variation in voltage and variation in the ambient temperature. The primary instrument 1 may be similar to that described in Patent No. 1,885,054 and illustrated particularly in Figs. 1 to 5, inclusive, being indicated generally by the reference character "12" in said patent.

The instrument, which is an ambient compensated thermally responsive device, comprises a U-shaped bimetallic thermostatic element which may be supported in a suitable casing and pivoted on an axial line 5. The upwardly extending arm 6 of the element is retained against a stop 7 by means of a spring member 8, and the arm 9 is normally retained against an adjustable contact screw 10 supported in the casing. The arm 9 is provided with a heating winding 11, one end of which is electrically connected to the arm and the opposite end of which is connected to a conductor 12 which extends through the indicating instrument 2, from which it is connected to the battery 4 by means of a conductor 13. The battery 4 is electrically connected to the contact screw 10 by means of a conductor 14. It will, therefore, be obvious that the heating winding 11 is in series with the indicating instrument 2 and the battery 4. The circuit may be provided with a switch 15.

The operation of the primary instrument 1 is substantially as follows: Assuming that the switch 15 is closed, the thermostat arm 9 is heated by the current flowing through the heating winding 11 and the arm will flex or bend and move away from the contact screw 10, thereby breaking the circuit. The immediate cooling of the thermostat arm 9 will cause the circuit to be again closed and the operation will be repeated indefinitely, thereby causing a pulsating direct current to flow through the circuit to operate the indicator. The contact screw 10 may be adjusted as desired to take up wear on the contacts and to time the impulses.

In order to compensate for variations in ambient temperature and maintain a predetermined energy flow, the bimetallic arm 6 is provided, and the warping or flexing of the contact arm 9, due to variations in ambient temperature, will be compensated for by the corresponding flexing of the thermostat arm 6 which tends to move the entire thermostatic element on the axis 5, thereby maintaining the same action of the arm 9 relative to the contact 10, regardless of variations in ambient temperature.

The energy responsive indicator 2 may be constructed in a similar manner to the primary instrument 1, and comprises an ambient compensated bimetallic thermostatic element 16 pivoted on the axial line 17 and provided with arms 18 and 19. The arm 18 is provided with a heating winding 20 which is in series with the heating winding 11 of the primary instrument. A spring 21 is arranged to maintain the arm 19 against an adjustable stop 22, whereby the flexing of the arm 19 controls the relative position of the arm 18 in accordance with variations in ambient temperature in the same manner as previously described for the primary instrument. The thermally responsive arm 18 engages a pivoted member 23 having an indicator needle 24 thereon arranged to be moved in accordance with the movement of the arm 18 in response to temperature induced by the winding 20. The arm 19 is flexed in accordance with variations in ambient temperature and tends to move the thermostatic device around the axis 17 to thereby compensate for ambient temperature variations in the same manner as described for the primary instrument 1. The position of the needle 24 will therefore take a position on the indicator scale corresponding to the total energy flowing through the instrument 2.

The condition responsive device 3 may comprise a float arm 25 pivoted at 26 and having the usual float 27 thereon. The arm 25 is provided with a contactor 28 which may be suitably insulated therefrom and which is arranged to contact a resistor winding 29. The winding 29 and the arm 28 comprise a so-called rheostat 30 which may be of any suitable type and which is preferably arranged to increase or decrease the resistance of the circuit by logarithmic increments in response to movement of the float 27. The rheostat 30 is connected in the circuit in a manner to control the flow of energy through the indicating instrument 2 and manner of accomplishing this is by means of a shunt circuit 31. A resistor 32 may be connected in series with the heater coil 20 of the indicator whereby the desired circuit characteristic may be obtained.

It will be apparent that with the float in the position illustrated in the drawing, a low liquid level is indicated and the maximum current will flow through the shunt circuit 31 and the high resistance of the instrument will prevent the flow of sufficient current to affect the indicator. Therefore, the indicator needle 24 will remain at zero, indicating the lowest liquid level. As the float 27 is raised in response to the higher liquid level, the rheostat 30 is operated to increase the resistance in the shunt circuit 31 and to cause an increased flow of current through the indicator 2. The needle 24 will therefore be moved to a position commensurable with the liquid level, and the indication will be uniform and relative to the liquid level, regardless of variations in the ambient temperature at either the indicator or the primary instrument, and also regardless of variations in voltage in the circuit. Voltage variations of the source 4 are compensated by corresponding variations in the duration of individual pulsations of current in the circuit, since the primary instrument operates to cause a constant flow of energy through that part of the circuit in which it is connected. If the voltage drops, the current flows for a longer period during each pulsation and if the voltage increases, the current flows for a shorter time during each pulsation. Therefore, the energy flow will remain constant.

It will be noted that the primary function of the instrument 1 is to compensate for voltage variation and that the remaining parts of the apparatus would function in the same manner if a different or equivalent voltage compensating means were employed. Also, it will be noted that by adjustment of the contact screw 10 that the pressure of the free end of arm 9 against the contact screw may be altered whereby the arm 9 will be required to flex a greater or lesser degree to break the contact between arm 9 and the contact screw 10 or that a greater or lesser energy flow through heating coil 11 will be required. Thus, by manipulation of contact screw 10 the heating effect of coil 20 associated with arm 19 of thermostatic element 16 may be varied for the same position of arm 28 in contact with winding 29 and this affords a calibrating means for positioning the indicator needle.

Also, it will be noted a further calibration may be effected by adjustment of stop 22 to bodily move thermostatic element 16 including arm 18 and resultantly the pivoted member 23 and indicator needle 24. As previously pointed out, due to the high resistance of the indicator circuit including the resistor 32 and coil 20, the amount of current flowing through the indicator circuit when the contact arm 28 is in the position illustrated is negligible so that adjustment of contact screw 10 has no appreciable effect on the zero position of the indicator needle 24. Thus, when the contact arm 28 is in the position illustrated, the indicator needle 24 can be quickly and easily set at zero reading on the scale by manipulation of adjustable stop 22 and the maximum position corresponding to a full tank can be correctly set by adjustment of contact screw 10. A relatively simple method is thereby provided for calibrating the indicating device.

Only one embodiment of the invention is shown and described. However, it will be understood that modifications may be made without departing from the spirit of the invention, and it is desired therefore that the invention be limited only by the prior art and the scope of the appended claims.

Having thus described my invention, what I claim is:

1. In an electrical indicating system, the combination with a power source, of an ambient temperature compensated bi-metallic arm, an electric heating coil associated with said arm, a pivotally mounted indicator needle, said arm being adapted to move said indicator needle in correspondence with the electrical heating effect thereof, an electrical contact, a second ambient temperature compensated bi-metallic arm adapted to intermittently engage said contact to cause current pulsations whose aggregate heating value in a given interval is substantially constant despite voltage variation, a heating coil associated with said second arm, circuit conductors connecting said electrical contact and each of said heating coils with the power source, a resistor in circuit with said heating coils, and a contact member, movable over the resistor, responsive to variations in a physical condition to alter the current traversing each of said heating coils, and correspondingly alter the position of the indicator needle.

2. The indicating system as described in claim 1 and wherein said contact is adjustable to vary the aggregate heating effect of said impulses in a given interval for a given position of the movable contact arm with respect to the resistor.

3. In an electrical indicating system, a power source, a first electro-thermal responsive device, a second electro-thermal responsive device, a pair of electrically heated coils each thermally associated with a different one of said devices, a resistor connected to control the flow of current through one of said heating coils, means responsive to variations of a measured quantity to vary the resistance of said resistor, the other heating coil being connected in circuit relative to the first heating coil so that variation in current traversing the first heating coil effects variation of current traversing the second heating coil, a pivotally mounted indicating hand, and means whereby the indicating hand will be moved under the joint control of both said devices.

4. An electrical indicating system as described in claim 3 and wherein each of said devices is adjustable to alter the position of the indicating hand for a given current traversing the resistor.

5. The indicating system described in claim 3 and wherein a scale is associated with the indicating hand having a zero and full position, an adjustment for one of said devices for altering the position of the indicating hand at the zero position without substantially affecting the reading at the full position, and an adjustment for the other of the said devices for altering the reading at the full position for a given current value without substantially affecting the reading at the zero position.

6. The combination comprising an electrical indicating instrument responsive to the total energy flowing therethrough, an adjustable resistor connected in circuit with said instrument to control the flow of energy therethrough, means responsive to a condition to be indicated for adjusting said resistor, a source of electric power subject to voltage variations, and means connected in series with said source for maintaining substantially constant the average flow of energy through at least a portion of the circuit, said means comprising a thermally responsive device provided with a heating coil, a pair of contacts connected in series with said coil, one of said contacts being controlled by said thermally responsive device.

7. The combination comprising an ambient temperature compensated thermally responsive device provided with a heating coil, an indicator actuated by said device, an adjustable resistor connected in circuit with said coil to control the flow of energy therethrough, means for adjusting said resistor in response to a physical condition to be indicated, a source of electrical power subject to voltage variations, a second thermally responsive device provided with a heating coil, a pair of contacts controlled by said second device and connected in series with said source and said latter coil whereby the average energy flowing through said coil will be maintained substantially constant, and means interconnecting said latter device with said first device to supply energy thereto.

8. The combination comprising an ambient temperature compensated thermally responsive device provided with a heating coil, an indicator hand actuated by said device, an adjustable resistor connected in circuit with said coil to control the flow of energy therethrough by shunting a portion thereof, means responsive to a physical condition to be indicated for adjusting said resistor, a source of electrical power subject to voltage variations, and means connected between said source and said resistor for maintaining substantially constant the average energy flowing through at least a portion of the circuit, said means comprising a second thermally responsive device provided with a heating coil, and a pair of contacts connected in series with said coil, at least one of said contacts being controlled by said thermally responsive device.

9. The combination comprising an ambient temperature compensated thermally responsive device provided with a heating coil, an indicating hand actuated by said device, an adjustable resistor connected in circuit with said coil so that at least a portion of said resistor is in shunt relation to said coil, means responsive to a physical condition to be indicated for adjusting said resistor, a source of electric power connected to supply said circuit, and means connected in series with said source for maintaining the average energy supplied substantially constant, said means comprising a thermally responsive element provided with a heating coil, a pair of contacts connected in series with said coil, said contacts being actuated in responsive to thermal change of said element.

10. In an electrical indicating system, the combination with a power source, of an indicating unit comprising a pivoted indicator needle, an ambient temperature compensated bimetallic element having the free end portion thereof adapted to engage the indicator needle at a point spaced from the needle pivotal axis, an electrical heating coil associated with said element, a variable resistor connected in circuit with said heating coil, means varying the resistor in accordance with variations of a measured quantity to alter the current traversing the heating coil, and a second bimetallic element having a heating coil associated therewith, said coil being connected between said source and said first coil and said resistor, to compensate for voltage variation of the circuit and maintain the position of the indicator needle substantially constant for a given resistance in the circuit.

THEODORE J. SMULSKI.